(12) United States Patent
Floyd et al.

(10) Patent No.: US 8,214,663 B2
(45) Date of Patent: Jul. 3, 2012

(54) USING POWER PROXIES COMBINED WITH ON-CHIP ACTUATORS TO MEET A DEFINED POWER TARGET

(75) Inventors: Michael S. Floyd, Cedar Park, TX (US);
Karthick Rajamani, Austin, TX (US);
Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 12/424,158

(22) Filed: Apr. 15, 2009

(65) Prior Publication Data
US 2010/0268974 A1    Oct. 21, 2010

(51) Int. Cl.
*G06F 1/26* (2006.01)
*G06F 1/28* (2006.01)
*G06F 1/32* (2006.01)

(52) U.S. Cl. ........ 713/300; 713/310; 713/320; 713/321; 713/322; 713/323; 713/324; 713/330; 713/340

(58) Field of Classification Search ................ 713/300, 713/310, 320–324, 330, 340
See application file for complete search history.

(56) References Cited

U.S. PATENT DOCUMENTS

| | | | |
|---|---|---|---|
| 5,719,800 A * | 2/1998 | Mittal et al. ................. | 713/321 |
| 7,444,526 B2 | 10/2008 | Felter et al. | |
| 8,060,765 B1 * | 11/2011 | Cha et al. ...................... | 713/322 |
| 2003/0097510 A1 | 5/2003 | Joseph | |
| 2005/0044429 A1 * | 2/2005 | Gaskins et al. ............... | 713/300 |
| 2006/0090086 A1 * | 4/2006 | Rotem et al. .................. | 713/300 |
| 2006/0288241 A1 * | 12/2006 | Felter et al. ................... | 713/300 |
| 2009/0312848 A1 | 12/2009 | Anderson et al. | |

OTHER PUBLICATIONS

Felter, Wes et al., "A Performance-Conserving Approach for Reducing Peak Power Consumption in Server Systems", Proceedings of the 19th Annual International Conference on Supercomputing, Boston, Massachusetts, Jun. 20-22, 2005, pp. 293-302.
Hur, Ibrahim et al., "A Comprehensive Approach to DRAM Power Management", International Symposium on High-Performance Computer Architecture, IBM Corporation, University of Texas at Austin, Feb. 2008, pp. 305-316.
U.S. Appl. No. 12/139,928, filed Jun. 16, 2008, Floyd, Michael S., et al.
Bose, Pradip et al., "On-Chip Power Proxy Based Architecture", Filed Apr. 15, 2009, U.S. Appl. No. 12/424,161, 34 pages.

* cited by examiner

*Primary Examiner* — Fahmida Rahman
(74) *Attorney, Agent, or Firm* — Francis Lammes; Stephen J. Walder, Jr.; Diana R. Gerhardt

(57) ABSTRACT

A mechanism is provided for using a power proxy unit combined with on-chip actuators to meet a defined power target value identifying a target power consumption of a component of a data processing system. A power manager in the data processing system identifies a proxy power threshold value, for the defined power target value, identifying a maximum power usage for the component, and a power usage estimate value identifying a current power usage estimate for the component. The power manager sends a set of signals to one or more on-chip actuators in the power proxy unit associated with the component in response to the power usage estimate value being greater than the power proxy threshold value. The one or more on-chip actuators adjusts a set of operational parameters associated with the component in order to meet the defined power target value.

20 Claims, 10 Drawing Sheets

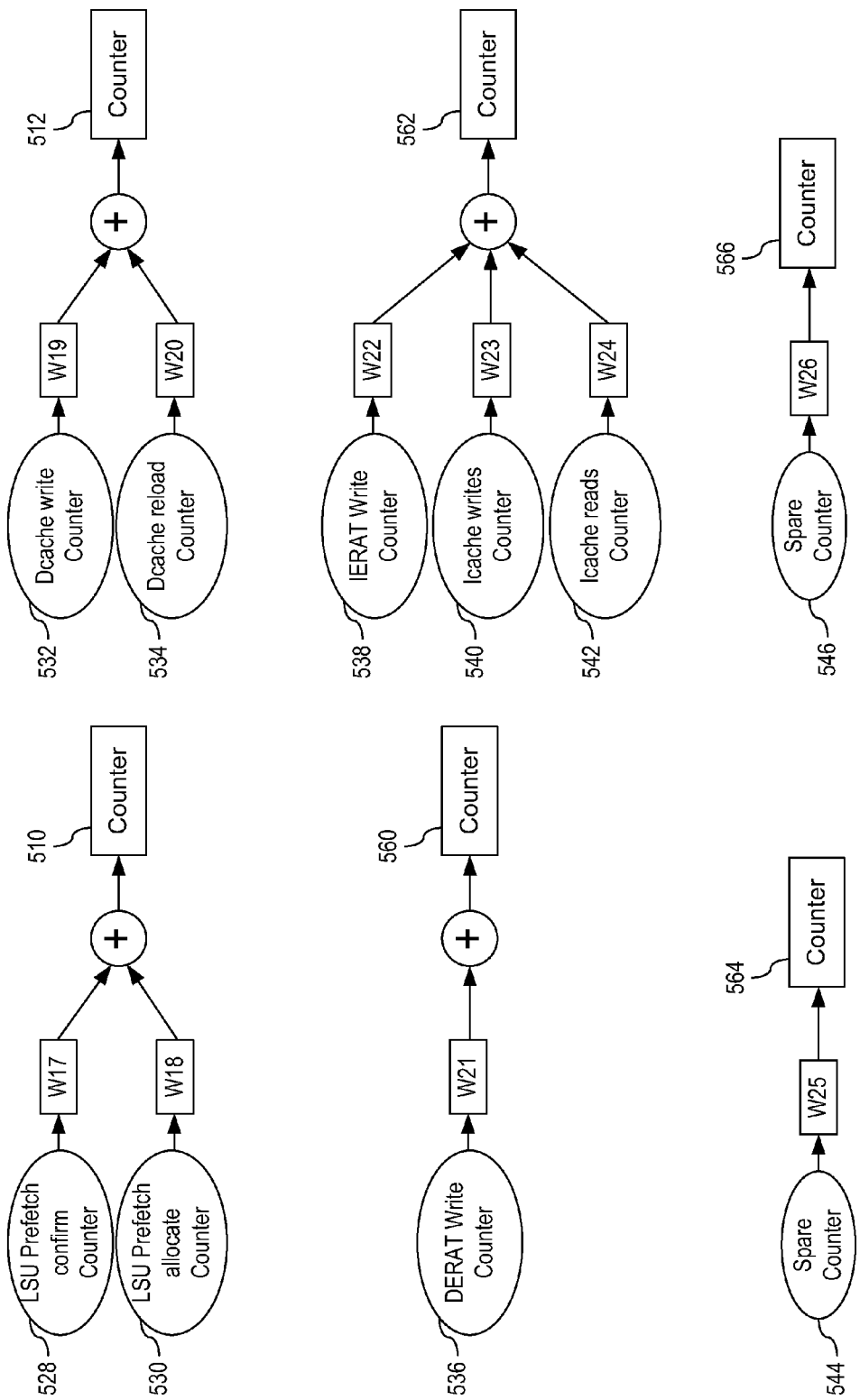

USING POWER PROXIES COMBINED WITH ON-CHIP ACTUATORS TO MEET A DEFINED POWER TARGET

This invention was made with United States Government support under Agreement No. HR0011-07-9-0002 awarded by DARPA. The Government has certain rights in the invention.

BACKGROUND

The present application relates generally to an improved data processing apparatus and method and more specifically to an apparatus and method for using power proxies combined with on-chip actuators to meet a defined power target.

As multi-core processors become more commonplace, power management issues become more important. Multi-core processors refer to a central processing unit that includes multiple complete execution cores per physical processor. The central processing unit combines multiple processors and their caches and cache controllers onto a single integrated circuit (silicon chip). Multi-core processors are well suited for multi-tasking environments because there are multiple complete execution cores instead of one, each with an independent interface to the front side bus. Since each core has its own cache, the operating system has sufficient resources to handle most compute intensive tasks in parallel.

Effective power management in a microprocessor requires measurement or approximation of power. However, the measurement of real calibrated power consumption in hardware is a difficult and complex task. That is, measuring real calibrated power consumption may be complicated due to the difficulties in isolating the voltage and current delivery to the appropriate unit/associated activity and adding the instrumentation in the power distribution network (on-chip) to measure them. Furthermore, real power measurements would be analog, thus, converting and integrating the analog signals into digital signals appropriate for digital control systems on-chip is non-trivial both technically and economically.

SUMMARY

In one illustrative embodiment, a method, in a data processing system, is provided for using a power proxy unit combined with on-chip actuators to meet a defined power target value identifying a target power consumption of a component of the data processing system. The illustrative embodiments identify, by a power manager in the data processing system, a proxy power threshold value, for the defined power target value, identifying a maximum power usage for the component, and a power usage estimate value identifying a current power usage estimate for the component. The illustrative embodiments determine, by the power manager, if the power usage estimate value is greater than the power proxy threshold value. Responsive to the power usage estimate value being greater than the power proxy threshold value, the illustrative embodiments send, by the power manager, a set of signals to one or more on-chip actuators in the power proxy unit associated with the component. The illustrative embodiments adjust, by the one or more on-chip actuators, a set of operational parameters associated with the component in order to meet the defined power target value.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B illustrate a block diagram of exemplary core activity counting in accordance with an illustrative embodiment;

DETAILED DESCRIPTION

Figure 1:
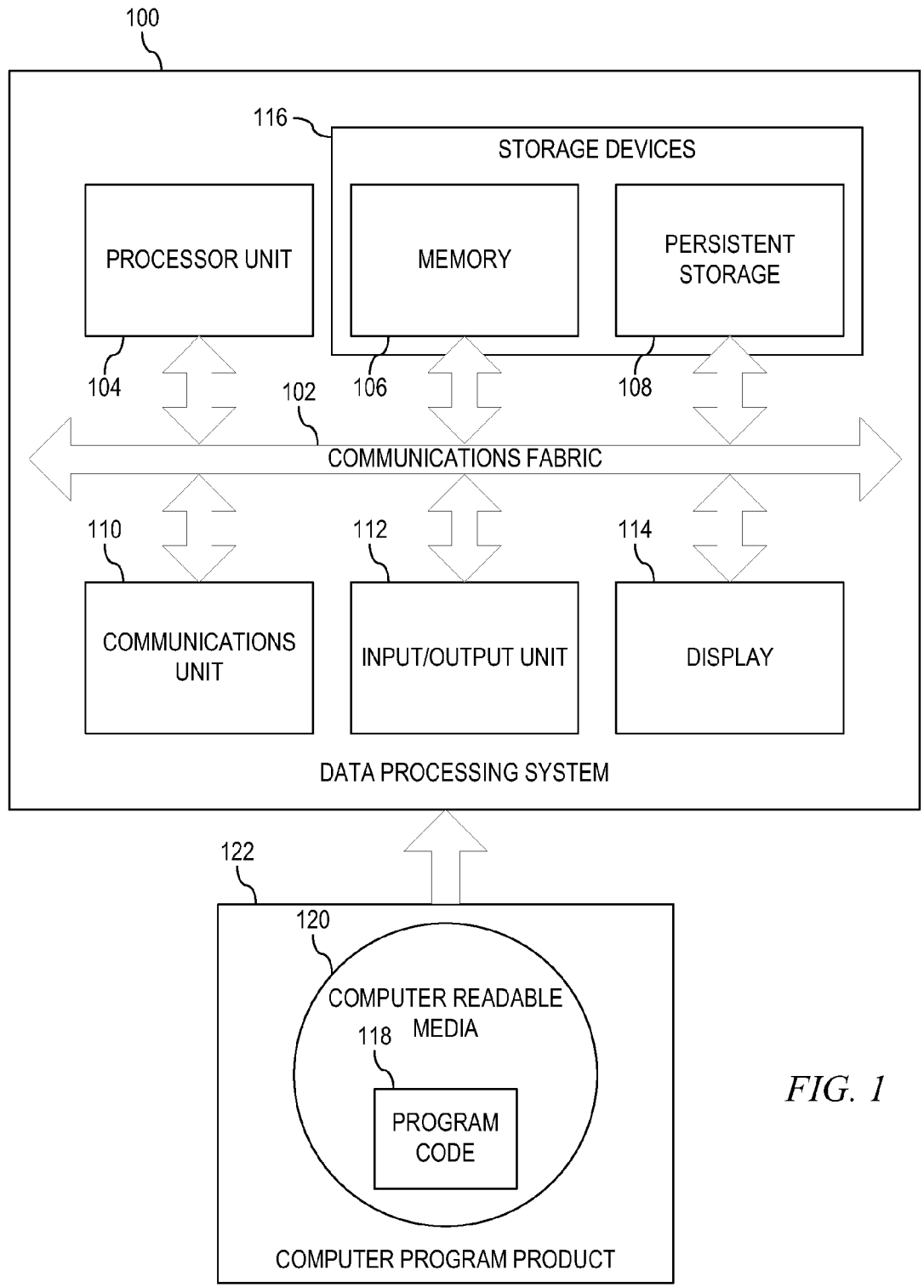
FIG. 1 depicts a block diagram of a data processing system in which illustrative embodiments may be implemented.

When managing the power of a computer system, there may be a desire to allocate a certain amount of power to each component, such as each core in a multi-core processor, in the process of making power/performance tradeoffs, which may generally be known as power shifting. For example, if one processor core is not busy or not doing useful work, lowering the processor core's frequency, voltage, or pipeline instruction rate, and giving that amount of power saved to another busy processor core may be beneficial in order for the busy processor core to operate at a higher frequency and improve overall system performance. In the past, administrators have used either direct power measurements or a rough estimation for power based on activity or some other metric. Then, heuristic algorithms in firmware attempt to balance the power and performance equation. The problem with this solution is that the measurement and reaction time is slow and most often done by performing equations to estimate power in software. The primary benefit of basing the control around power proxies as described in the illustrative embodiment is that power proxies provide a freedom from needing a suitably instrumented power delivery system while still providing a means to measure and control, at a fine-grain level, the activity and phenomena that cause power consumption.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for using power proxies combined with on-chip actuators to meet a defined power target. Power proxies are some event or activity counts scaled in proportion to the power consumption associated with the phenomena of the activities. Power proxies may be used when direct measurement of power consumption for associated phenomena are impractical or impossible to realize. A high-level power management controller in a data processing system automatically adjusts a power proxy threshold value for a defined power target for each of a set of components in component hardware indicating a "target" power consumption for that component. The component hardware compares an obtained power proxy usage estimate to the set power proxy threshold value. In response to the obtained power proxy usage estimate exceeding the set power proxy usage estimate, the component hardware engages an on-chip actuation to either increase or decrease the power consumption of the component. Therefore, the components manage their own "soft power cap" as allocated by the high-level power management controller of the data processing system. Having immediate on-chip actuation and immediate accurate on-chip/component power proxy information improves the power management of the data processing system.

Figure 2:
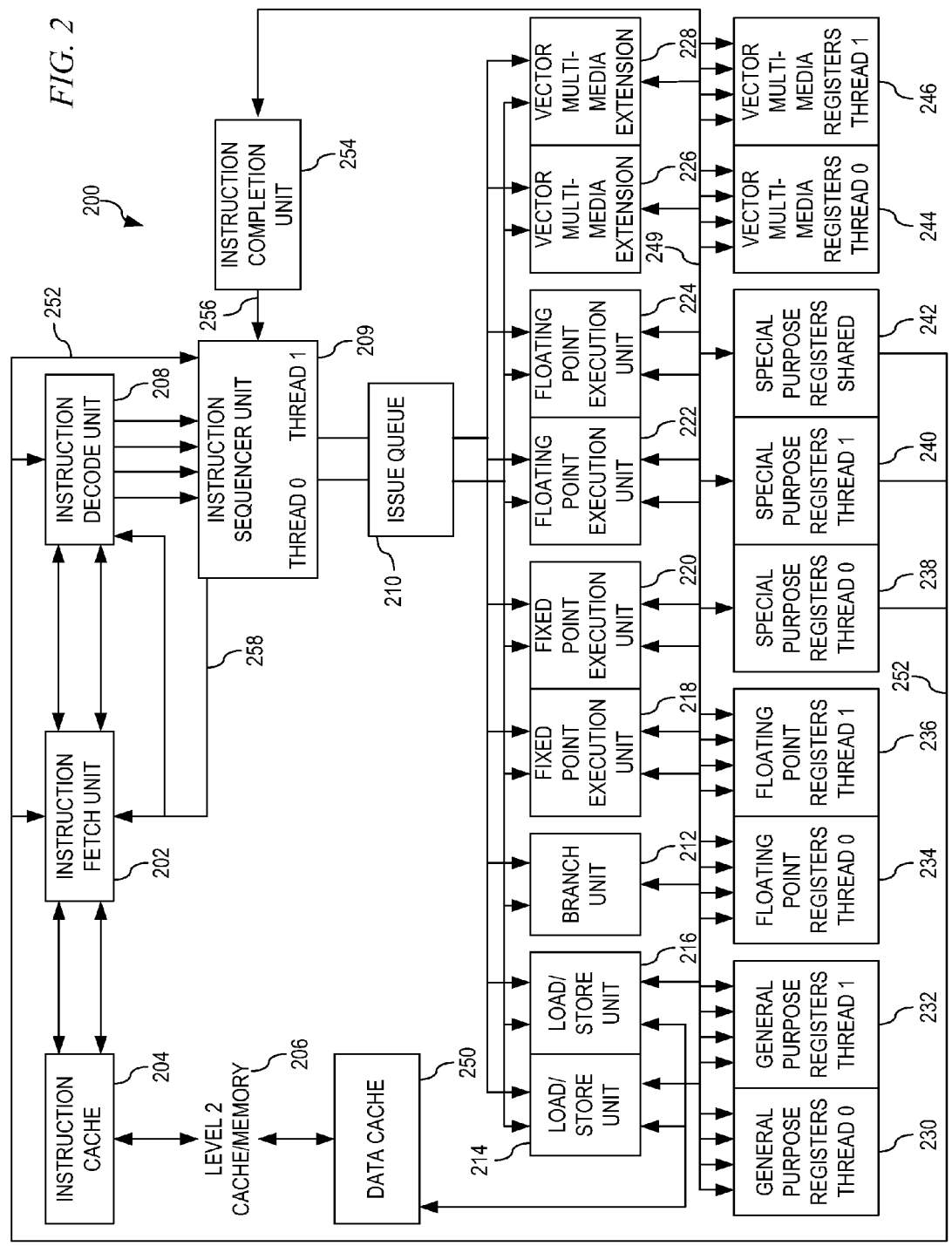
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of using power proxies combined with on-chip actuators to meet a defined power target, this is only an example and is not intended to state or imply any limitation with regard to the features of the present invention. To the contrary, the illustrative embodiments are intended to include distributed data processing environments and embodiments in which power proxies combined with on-chip actuators may be used to meet a defined power target.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

In the illustrative embodiments, high-level power management controller monitors temperature, leakage voltage, and/or the like, for each of a set of components in the data processing system. Based on an overall predetermined power scheme for the data processing system, the high-level power management controller automatically adjusts a power proxy threshold value to meet a defined power target for each component in the set of components. Component hardware compares an obtained power proxy usage estimate of the component to the power proxy threshold value identified by the high-level power management controller. In response to the obtained power proxy usage estimate exceeding the set power proxy usage estimate, the component hardware engages an on-chip actuation to either increase or decrease the power consumption of the component by controlling a set of operational parameters, such as frequency, voltage, pipeline instruction rate, and/or the like. For example, there are many places within processor 200 where pipeline throttling control may be inserted to limit power consumption via a power manager as is described in detail below.

Figure 3:
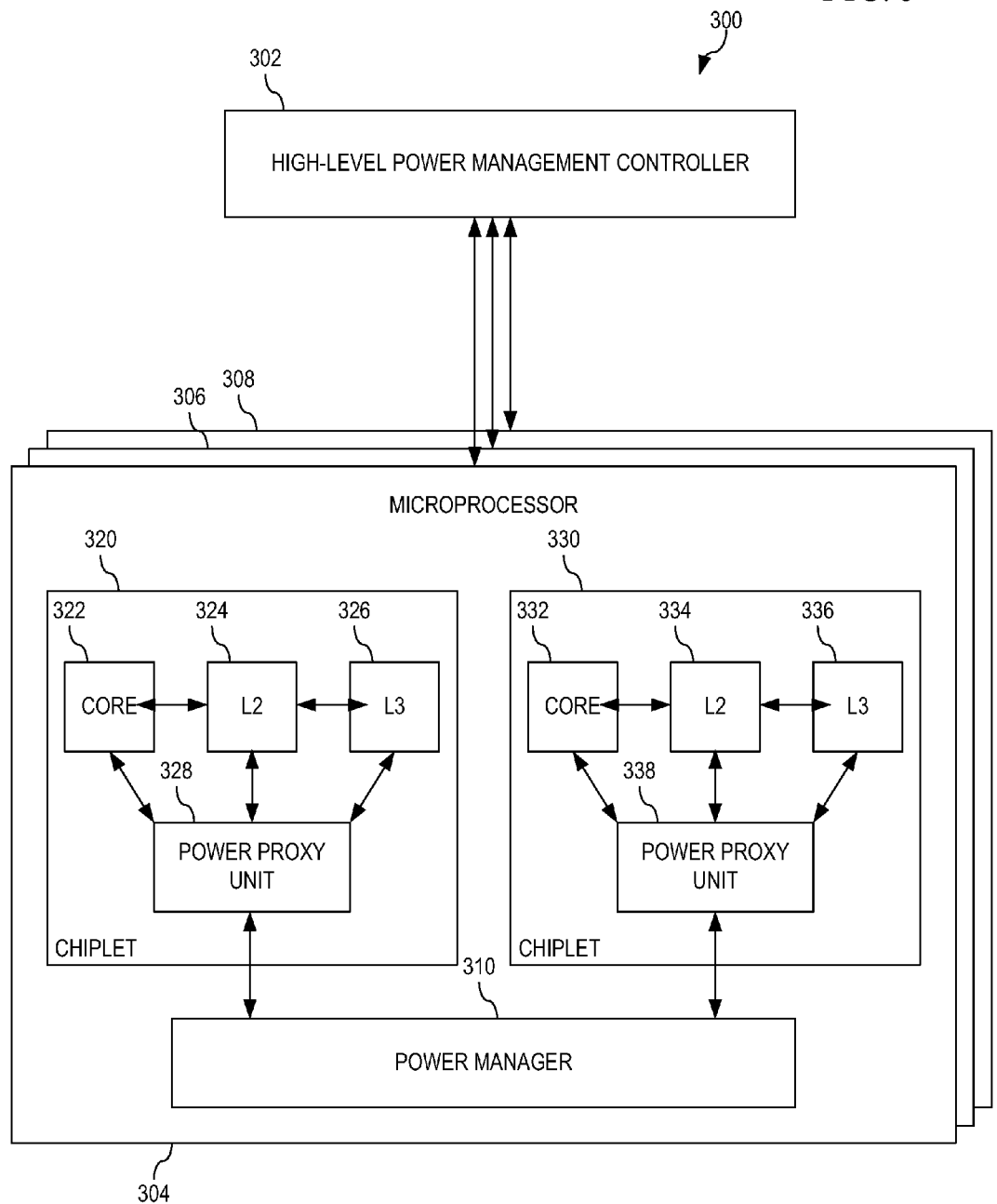
FIG. 3 illustrates an exemplary data processing system comprising a high-level power management controller in accordance with an illustrative embodiment.

FIG. 3 illustrates an exemplary data processing system comprising a high-level power management controller in accordance with an illustrative embodiment. Data processing system 300 comprises high-level power management controller 302 and a set of microprocessors 304, 306, and 308. During the execution of applications or software on data processing system 300, high-level power management controller 302 monitors various conditions associated with a set of components on each of microprocessors 304, 306, and 308. The various conditions may comprise the voltage consumed by each component, the temperature of areas associated with each of the components, voltage leakage associated with each of the components, or the like.

One example of monitoring the temperature of areas associated with each of the components, high-level power management controller 302 monitors a set of thermal sensors (not shown) associated with one or more components in each of microprocessors 304, 306, and 308. Each of the thermal sensors may be positioned adjacent to areas within the component that typically experience the greatest rise in temperature during the execution of most applications. An example of monitoring voltage consumed by each component, high-level power management controller 302 may monitor power proxy power usage estimate values from each of power proxy units 328 and 338, which are stored in power manager 310 as is described in detail below. One an example of monitoring voltage leakage associated with each of the components, high-level power management controller 302 may monitor voltage leakage by using special circuitry (not shown) for Iddq (leakage current) measurements on-chip and under controlled conditions to isolate leakage power from active power. In order to provide accurate and real-time voltage leakage computation, the illustrative embodiment may use a combination of (i) offline characterization of chip regions for leakage characteristics and (ii) online computation of leakage power values for each region based on voltage, temperature in region, parameters determined from off-line characterization, or the like. That is, voltage leakage may be computed mathematically as a function of voltage, temperature, transistor characteristics, or the like for that region. Alternatively, the illustrative embodiments may use look-up tables indexed by voltage and temperature values, with the power in the table entries populated by offline characterization or based on design. The above are only examples of ways high-level power management controller 302 may monitor temperature, voltage consumption, and voltage leakage. One of ordinary skill in the art would realize that there are other ways to monitor temperature, voltage consumption, and voltage leakage without departing from the spirit and scope of the invention.

High-level power management controller 302 monitors the temperature, voltage consumption, and voltage leakage of each component and uses the gathered information, along with a power scheme for data processing system 300 to determine a power proxy threshold value to meet a defined target for each component. High-level power management controller 302 then sets or adjusts a power proxy threshold value for each of the monitored components in power manager 310 of each of microprocessors 304, 306, and 308.

Each of microprocessors 304, 306, and 308 comprises power manager 310 and chiplets 320 and 330. A chiplet is a processor core plus some memory cache, such as an L2, L3, or L4 memory cache, or some combination thereof. Chiplet 320 comprises core 322, L2 cache 324, L3 cache 326, and power proxy unit 328. Chiplet 330 comprises core 332, L2 cache 334, L3 cache 336, and power proxy unit 338. While FIG. 3 shows microprocessors 304, 306, and 308 as comprising two (2) chiplets, alternate illustrative embodiments contemplate microprocessors 304, 306, and 308 as comprising any number of chiplets, from one to several.

Power proxy units 328 and 338 monitor a set of counters. Whenever an activity specified to be monitored occurs, power proxy unit 328 or 338 adds a value equal to a power usage weight associated with the activity to a counter. The counter is associated with one activity only. Then, periodically, the values held in the set of counters monitored by power proxy units 328 and 338 are collected by power proxy units 328 and 338. Power proxy units 328 and 338 each add these collected values together to arrive at a power usage estimate value for the unit monitored by each of power proxy units 328 and 338. Power proxy units 328 and 338 send these power usage estimate values to power manager 310. Power manager 310 compares the power usage estimate value from power proxy units 328 or 338 to the received power proxy threshold value from high-level power management controller 302 for that component. Based on the comparison, power manager 310 sends signals to one or more on-chip actuators (not shown) in power proxy units 328 and 338 in order for power proxy units to adjust operational parameters in order to achieve the power usage goals. The on-chip actuators within each of power proxy units 328 and 338 may control a set of operational parameters, such as frequency, voltage, pipeline instruction rate, and/or the like. A power usage goal may be a specific power usage cap. Based on the estimate, if the power usage is not being exceeded, power manager 310 may send signals for the on-chip actuators in power proxy unit 328 or 338 to increase the frequency, voltage, and/or pipeline instruction rate of the component. If the power usage estimate value exceeds the cap, then the power manager 310 may send signals for the on-chip actuators in power proxy unit 328 or 338 to decrease the frequency, voltage, and/or pipeline instruction rate of the component. Thus, the power manager is self-controlling based on the power proxy usage estimate values of power proxy units 328 and 338 and the power proxy threshold value for each component received from high-level power management controller 302.

Each of power proxy units 328 and 338 manages a set of counters. The power proxy unit collects the stored values for the set of counters the power proxy units manages in parallel. Further, a single power manager manages a set of power proxy units. Each power proxy has one or more units assigned that the power proxy unit monitors. The power proxy units may then collect values in parallel or independently of each other. Further, the collection period is configurable for each power proxy unit and each power proxy unit may collect the stored values for different periods than every other power proxy managed by a power manager.

Power manager 310 and power proxy units 328 and 338 have memory and a programmable interface that allows a user to specifically assign what specific counters will count what specific activities as well as assigning the weight to the activity. In some illustrative embodiments, power proxy units 328 and 338 track activity metrics on a per-chiplet basis, while in other illustrative embodiments, power proxy units 328 and 338 track the metrics on a per thread basis. Activity counters within each of power proxy units 328 and 338 track activities in cores 322 and 332, L2 cache 324 and 334, and L3 cache 326 and 336, respectively, and reset on activity read from the power proxy unit.

Each of power proxy units 328 and 338 count each of these activities in a counter. Power proxy units 328 and 338 multiply the individual counts by a weight factor specific to that particular activity to reach a value and store the value in an activity counter. A weight may be any value other than zero. In an illustrative embodiment, the weight factor comprises four bits. In other illustrative embodiments, the weight factor may be comprised of any number of bits.

Figure 4:
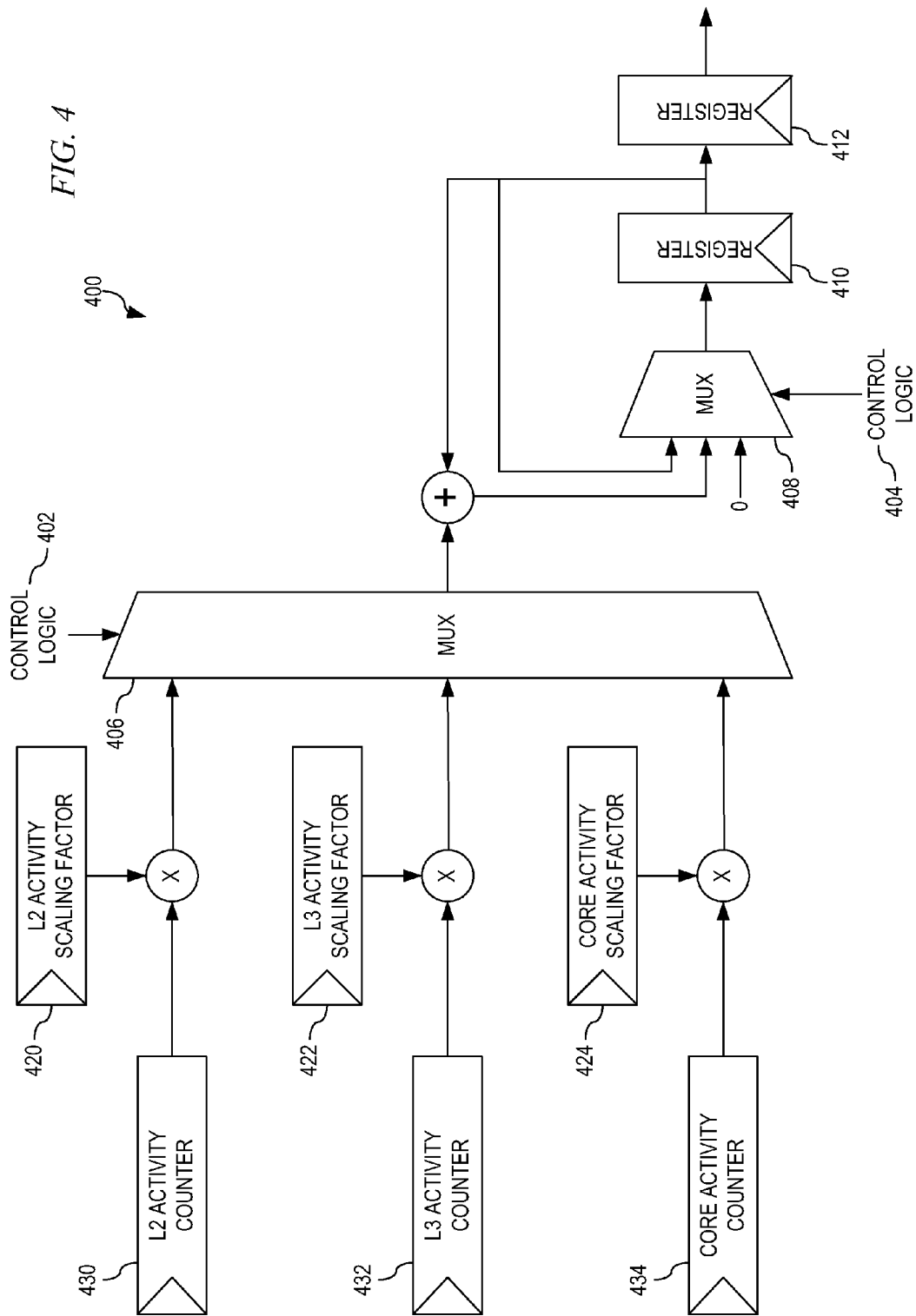
FIG. 4 is a block diagram of a power proxy unit in accordance with an illustrative embodiment.

FIG. 4 is a block diagram of a power proxy unit in accordance with an illustrative embodiment. FIG. 4 may be implemented as power proxy unit 328 or 338 of FIG. 3. When received by power proxy unit 400, power proxy unit 400 multiplies the values in L2 activity counter 430, L3 activity counter 432, and core activity counter 434 by L2 activity scaling factor 420, L3 activity scaling factor 422, and core activity scaling factor 424, respectively. Typically, one of these scaling values will be one. Multiplexer 406 receives these adjusted values, Multiplexer 406 and 408 may be implemented in hardware. Control logic 402, from a finite state machine (not shown) of the power proxy unit, determines which adjusted value, the adjusted L2 activity value, the adjusted L3 activity value, or the adjusted core activity value is selected to be summed by the power proxy unit. At multiplexer 408, control logic 404, from a finite state machine (not shown) of the power proxy unit, determines what value is to be added to register 410, either zero, or the value already in register 410, or the adjusted activity value selected by control logic 402. Once register 410 overflows, power proxy unit 400 adds the value in register 410 to the value in register 412. The value in register 412 is collected, periodically, by a power manager, such as power manager 310 in FIG. 3. The value in register 412 may be cumulative or interval specific, that is, register 412 may be reset once the power manager reads the value of register 412. If the value in register 412 is cumulative, then the power manager may have additional logic in order to differentiate a current value from and previous values.

Figure 5A:
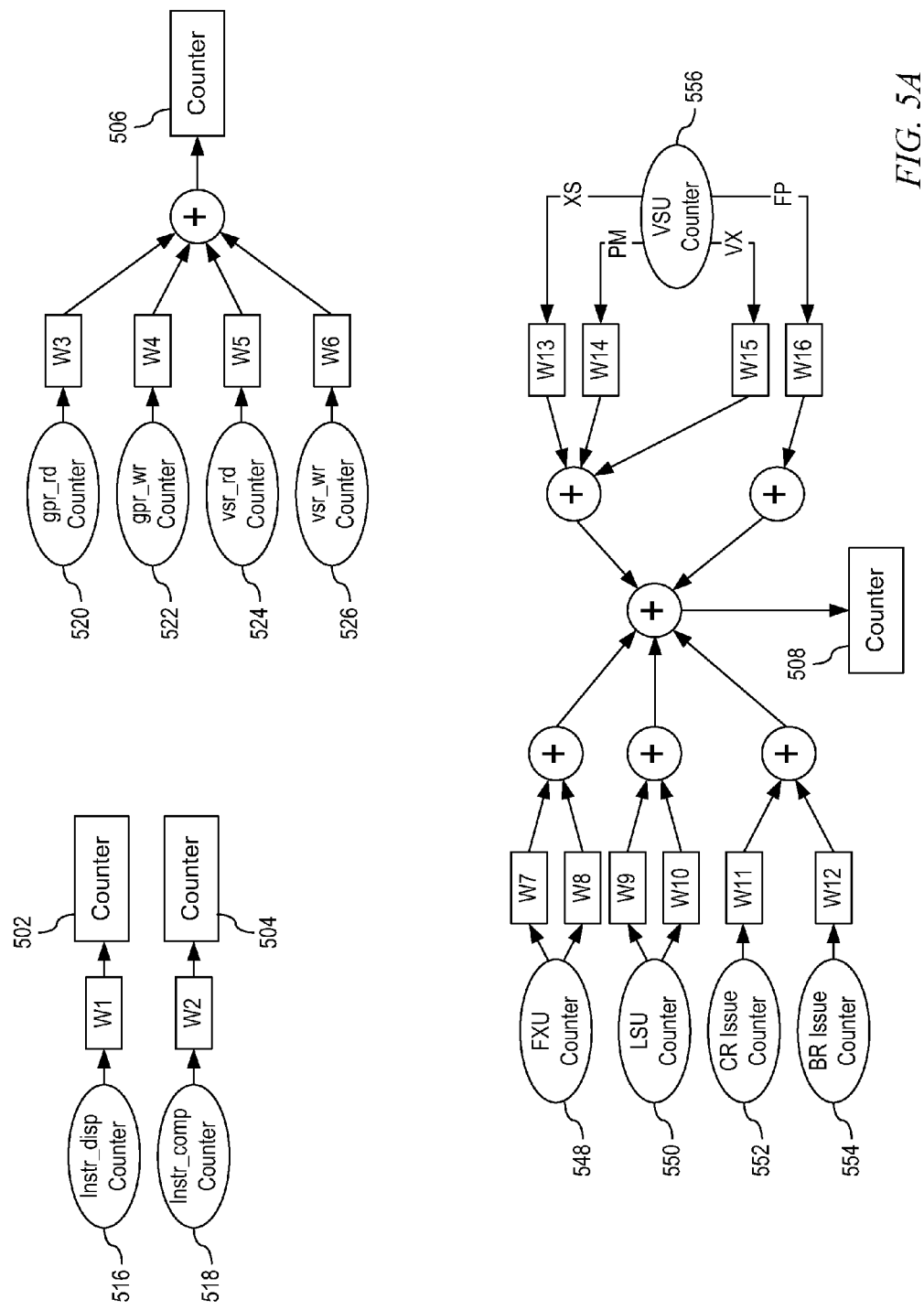

FIGS. 5A and 5B illustrate a block diagram of exemplary core activity counting in accordance with an illustrative embodiment. The activities illustrated in FIGS. 5A and 5B are examples of activities to be counted and eventually stored as a value in the core activity counter 434 of FIG. 4. Counters 502-556 and 560-566 are counters in a power proxy unit, such as power proxy unit 328 of FIG. 3. In one illustrative embodiment, before being stored in counters, the power proxy unit may divide the values that are to be stored in counters 516-526 by a certain value prior to storing the value in counters 516-526. Weights W1-W26 are weights associated with the activities being counted. In an illustrative embodiment, weights W1-W26 are four (4) bit values.

Instr_disp counter 516 counts instructions dispatched and instr_comp counter 518 counts instructions completed. The power proxy unit multiplies the count in instr_disp counter 516 by weight W1 and then this total value is stored in counter 502. The power proxy unit multiplies the count in instr_comp counter 518 by weight W2 and then this total value is stored in counter 504.

Gpr_rd counter 520 counts general purpose register reads (gpr_rd), gpr_wr counter 522 counts general purpose register writes (gpr_wr), vsr_rd counter 524 counts vector register file reads (vsr_rd), and vsr_wr counter 526 counts vector register file writes (vsr_wr). The power proxy unit multiplies the count in gpr_rd counter 520 by weight W3 and then sums this total value with the total value of the count in gpr_wr counter 522 multiplied by weight W4 and the total value of the count in vsr_rd counter 524 multiplied by weight W5 and the total value of the count in vsr_wr counter 526 multiplied by weight W6 stored in counter 506.

LSU prefetch confirm counter 528 stores a count of LSU prefetches confirmed. LSU prefetch allocate counter 530 stores a count of LSU prefetches allocated. Counter 510 stores a value equal to the count in LSU prefetch confirm counter 528 multiplied by weight W17 summed with the count from LSU prefetch allocate counter 530 multiplied by weight W18. Counter 560 stores a value equal to the count in DERAT write counter 536 multiplied by weight W21.

Dcache write counter 532 stores a count of data cache writes. Dcache reload counter 534 stores a count of data cache reloads. Counter 512 stores a value equal to the sum of the count in Dcache write counter 532 multiplied by weight W19 and the count in Dcache reload counter 534 multiplied by weight W20.

Icache writes counter 540 stores count of instruction cache writes. Icache reads counter 542 stores a count of instruction cache reads. IERAT write counter 538 stores a count of IERAT writes. Counter 562 stores a value equal to the sum of the count in IERAT write counter 538 multiplied by weight W22, the count in Icache writes counter 540 multiplied by weight W23, and the count in Icache reads counter 542 multiplied by weight W24.

FXU counter 548 stores a count of various instructions issued to an FXU unit, such as FXUA 218 of FIG. 2. The power proxy unit multiplies the count of these instructions by a corresponding weight, such as weight W7 and W8, forming adjusted values. The power proxy unit sums the adjusted values together with the adjusted values from the other counters and stores the summed value in counter 508. For example, weight W7 may correspond to instructions to multiply while weight W8 may correspond to instructions to divide. LSU counter 550 stores a count of load instructions issued plus a count of store instructions issued. The power proxy unit multiplies the count of load instructions issued by a weight W9 and multiplies the count of store instructions issued by a weight of W10, forming adjusted values. The power proxy unit sums the adjusted values together with the adjusted values from the other counters stored in counter 508. CR issue counter 552 stores a count of control register instructions issued. The power proxy unit multiplies the count of control register instructions issued by a weight W11, forming an adjusted value. The power proxy unit sums the adjusted values together with the adjusted values from the other counters stored in counter 508. BR issue counter 554 stores a count of branch instructions issued. The power proxy unit multiplies the count of branch instructions issued by a weight W12, forming an adjusted value. The power proxy unit sums the adjusted values together with the adjusted values from the other counters stored in counter 508.

VSU counter 556 stores a count of activities, which includes activities performed by both VMX 226 or 228 and FPU 222 or 224 of FIG. 2, only some of which are shown in FIGS. 5A and 5B. In the present example, VSU counter 556 stores a count equal to a sum of the count of permutation (PM) operations plus a count of floating point (FP) operations plus a count of simple vector (XS) operations plus a count of complex vector (VX) operations. The power proxy unit multiplies the count of the various operations by a corresponding weight, weight W13-15, summed together and then sums the adjusted values from the other counters and stores the value in counter 508.

Spare counters 544 and 546 represent additional activities that may be assigned a weight, W25 and W26, and tracked, depending upon a determination made by an authorized user, such as a designer. The power proxy unit sums together counters 502-512 and 560-566 and stores the summed value in core activity counter 434 in FIG. 4.

Figure 6:
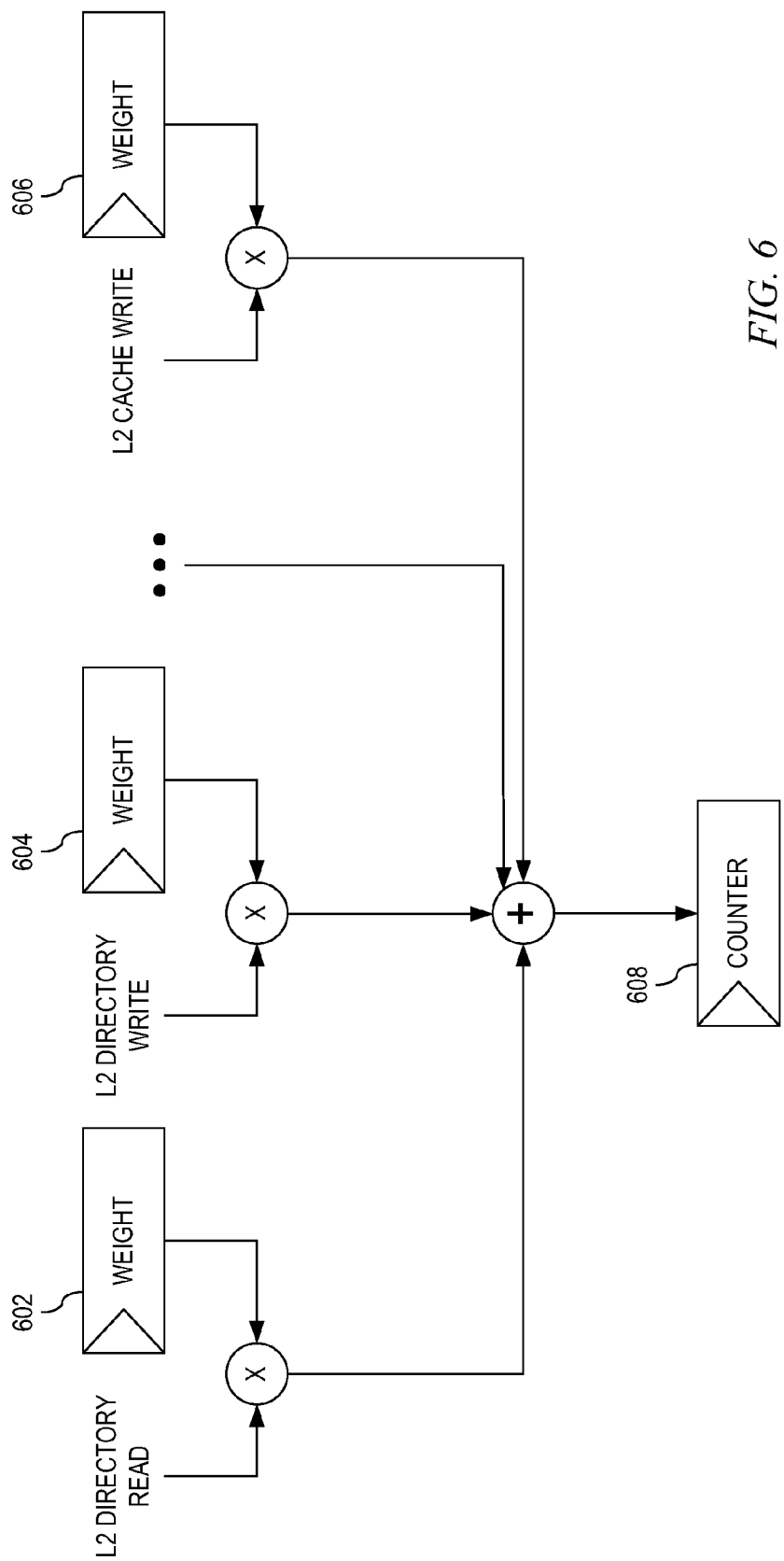
FIG. 6 illustrates a block diagram of exemplary L2 cache activity counting in accordance with an illustrative embodiment.

FIG. 6 illustrates a block diagram of exemplary L2 cache activity counting in accordance with an illustrative embodiment. While FIG. 6 shows L2 directory reads, L2 directory writes, and L2 cache writes as activities being counted and monitored, other activities including L2 cache targeted reads and L2 cache full reads may be counted and monitored. Further, while FIG. 6 shows L2 cache activities being counted, the process illustrated in FIG. 6 applies to L3 cache activities as well. Counter 608 comprises the sum of a count of L2 directory read operations multiplied by weight 602 plus a count of L2 directory write operations multiplied by weight 604 plus a count of L2 cache write operations multiplied by weight 606. Periodically, the power proxy unit multiplies and collects the value of counter 608 by a power manager, such as power manager 310 of FIG. 3.

Figure 7:
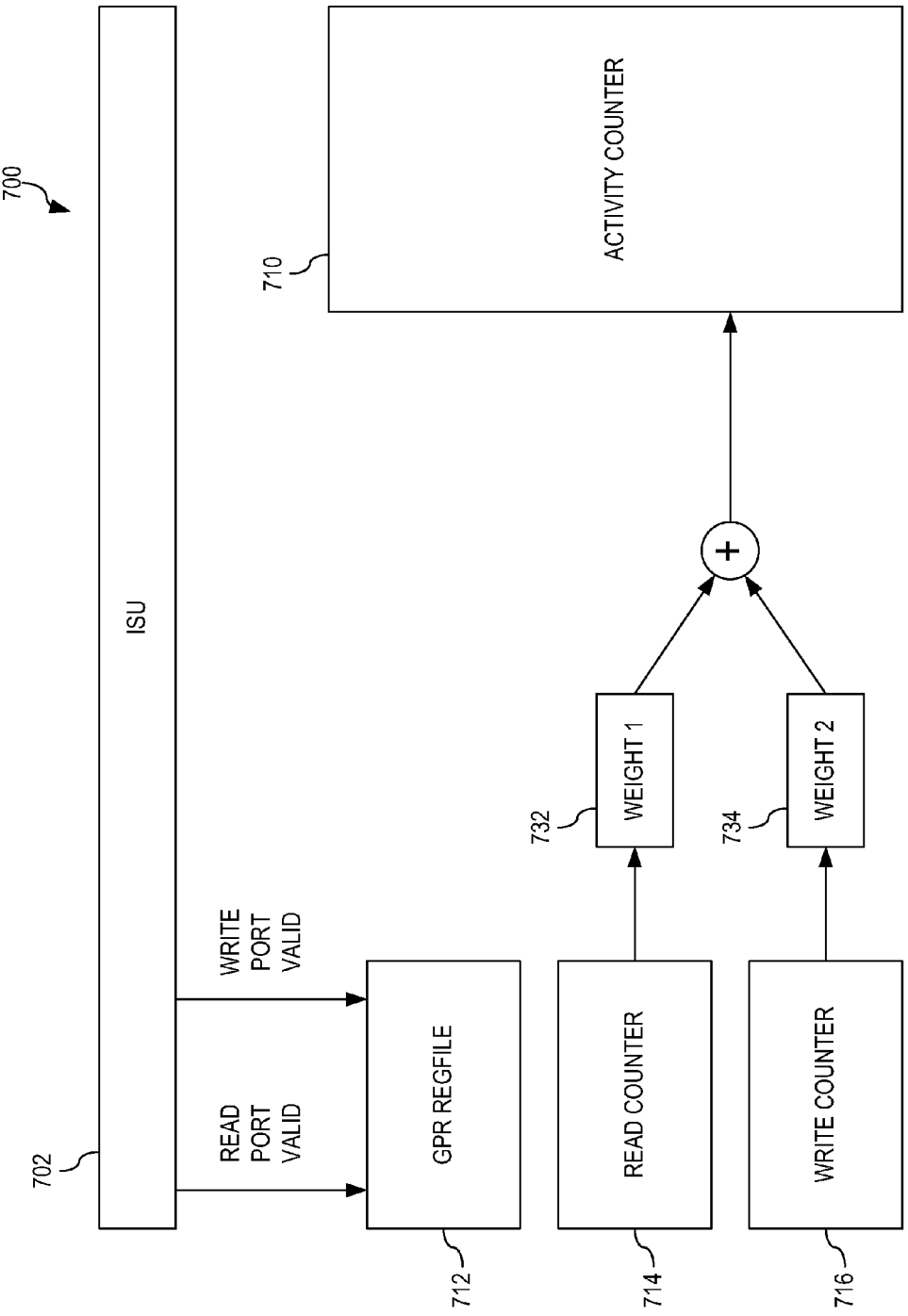
FIG. 7 illustrates a block diagram of performing execution regfile activity counts in accordance with an illustrative embodiment.

FIG. 7 illustrates a block diagram of performing execution regfile activity counts in accordance with an illustrative embodiment. System 700 comprises ISU 702, gpr regfile 712, read counter 714, write counter 716, and counter 710. ISU 702 is an instruction sequencer unit which may be implemented as instruction sequencer unit 209 of FIG. 2.

Whenever ISU 702 issues a valid read access request for gpr regfile 712, read counter 714 is incremented atomically, that is by one. Whenever ISU 702 issues a valid write access request for gpr regfile 712, write counter 716 increments atomically. System 700 multiplies the count in read counter 714 by weight 1 732 to arrive at a value. System 700 sums this value with the value of write counter 716 multiplied by weight 2 734 and stores the multiplied value in counter 710, which is part of a power proxy unit, such as power proxy unit 316 of FIG. 3. These weight factors are determined through pre-silicon and after silicon power modeling and are assigned by an authorized user through a power management unit, such as power manager 304 of FIG. 3.

Furthermore, system 700 collects the values for all the counters monitored by a power proxy unit in parallel. System 700 resets counter 710 when the values in counter 710 are sent to the power manager, such as power manager 310 of FIG. 3, which then adjusts the operational parameters of the component being monitored, such as a core or a thread, in order to achieve the power management goals, such as maintaining a certain temperature or a certain power usage level.

While FIG. 7 shows counting execution regfile activity on per core basis, in another illustrative embodiment, execution regfile activity may be tracked on a per thread basis, using the thread identifier. In such a case, read and write activities for each thread may be tracked using separate counters, which then send their counts to separate activity counters where counts would be multiplied by the appropriate weight factor and the total value stored in the activity counter. It should be understood that execution regfile activity is one type of activity that may be counted and the process illustrated in the example of FIG. 7 applies to all the types of activities to be monitored.

Thus, the high-level power management controller monitors temperature, voltage leakage, voltage consumption, and/or the like, for each of a set of components in the data processing system. Based on an overall predetermined power scheme for the data processing system, the high-level power management controller automatically set or adjusts a power proxy threshold value for each component in the set of components. Component hardware compares an obtained power proxy usage estimate of the component to the power proxy threshold value identified by the high-level power management controller. In response to the obtained power proxy usage estimate exceeding the set power proxy usage estimate, the component hardware engages an on-chip actuation to either increase or decrease the power consumption of the component.

Figure 8:
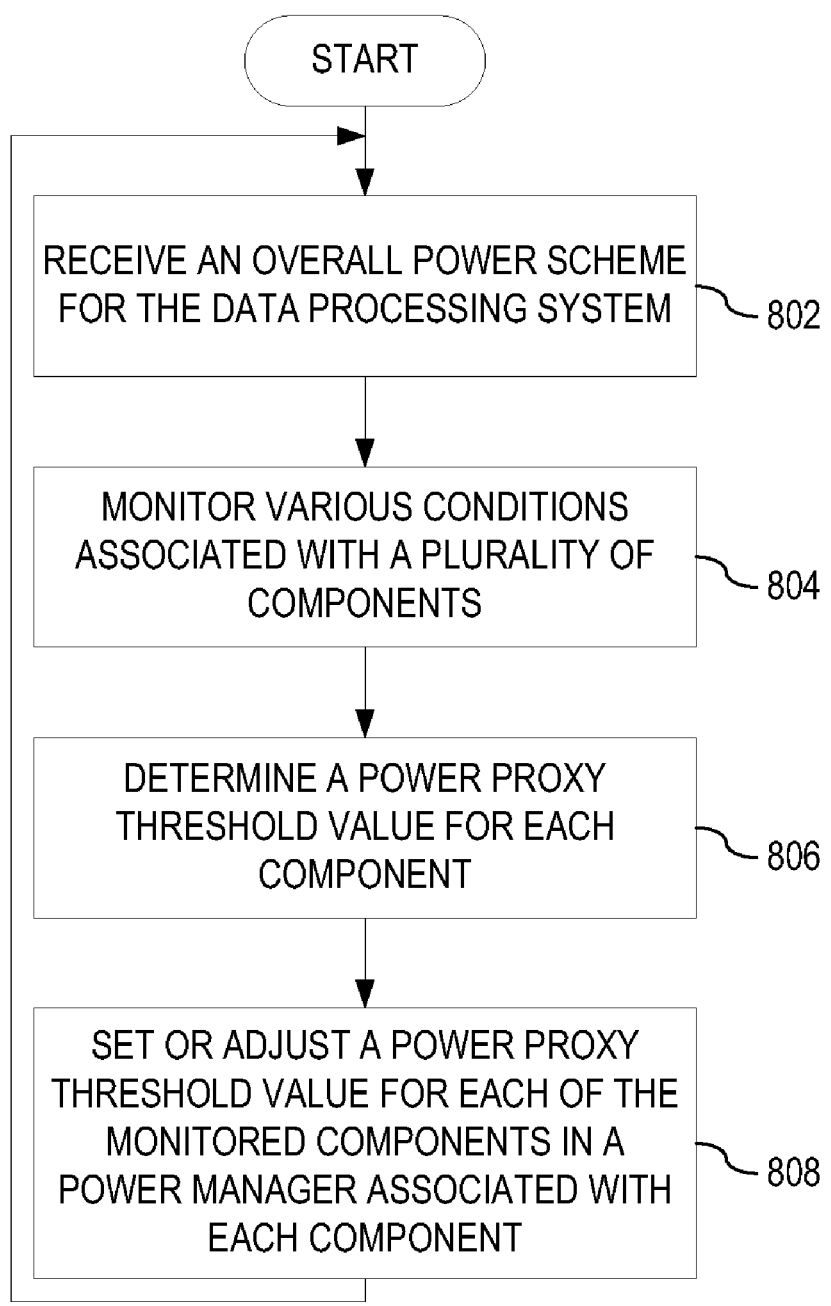
FIG. 8 is a flow diagram illustrating an exemplary operation performed by a high-level power management controller in accordance with an illustrative embodiment.

FIG. 8 is a flow diagram illustrating an exemplary operation performed by a high-level power management controller in accordance with an illustrative embodiment. The operation of FIG. 8 may be implemented in a high-level power management controller, such as high-level power management controller 302 of FIG. 3. As the operation begins, the high-level power management controller receives an overall power scheme for the data processing system in which the high-level power management controller resides (step 802). The high-level power management controller then monitors various conditions associated with a set of components on a set of microprocessors (step 804). The various conditions may comprise the voltage consumed by each component, the temperature of areas associated with each of the components, voltage leakage associated with each of the components, or the like. Using information pertaining to the temperature, voltage consumption, voltage leakage, or the like, for one or more of the components in the data processing system along with a power scheme for data processing system the high-level power management controller determines a power proxy threshold value for each component (step 806). The high-level power management controller then sets or adjusts a power proxy threshold value for each of the monitored components in a power manager associated with each component (step 808). The operation then returns to step 802 where high-level power management controller may receive a new overall power scheme and/or new information regarding the temperature, voltage consumption, voltage leakage, or the like, for one or more of the components in the data processing system.

Figure 9:
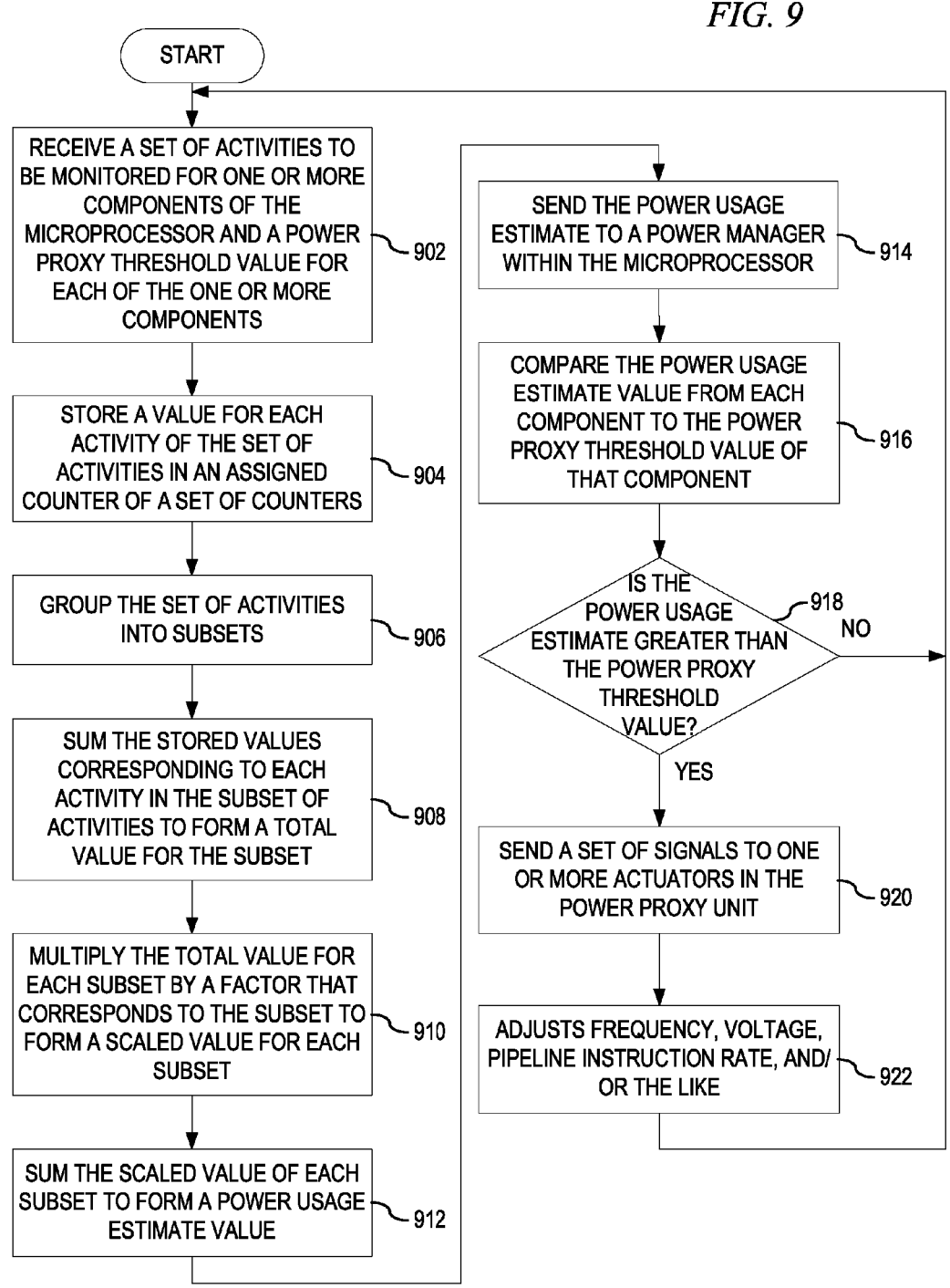
FIG. 9 is a flowchart illustrating an exemplary operation performed within a microprocessor in accordance with an illustrative embodiment.

FIG. 9 is a flowchart illustrating an exemplary operation performed within a microprocessor in accordance with an illustrative embodiment. The operation of FIG. 9 may be implemented in a microprocessor, such as microprocessor 304, 306, and/or 308 of FIG. 3. The operation begins, a power manager within the microprocessor receives a set of activities to be monitored for one or more components of the microprocessor and a power proxy threshold value for each of the one or more components (step 902). A power proxy unit for each monitored component stores a value for each activity of the set of activities in an assigned counter of a set of counters, forming a set of stored values, wherein the value comprises the count multiplied by a weight factor specific to the activity (step 904). The power proxy unit groups the set of activities into subsets (step 906). The subgroups correspond to where the activity occurs, such as L2 cache activity subset, core activity subset, and L3 cache activity subset.

The power proxy unit sums the stored values corresponding to each activity in the subset of activities to form a total value for the subset (step 908). The power proxy unit multiplies the total value for each subset by a factor that corresponds to the subset to form a scaled value for each subset (step 910). For example, L2 activity scaling factor 420 corresponds to L2 activity counter 430 in FIG. 4. The power proxy unit sums the scaled value of each subset to form a power usage estimate value (step 912). The power proxy unit then sends the power usage estimate value to a power manager within the microprocessor (step 914). The power manager compares the power usage estimate value from each component to the power proxy threshold value of that component (step 916). The power manager then determines if the power usage estimate value from the component is greater than the power proxy threshold value for that component (step 918). If at step 918 the power usage estimate value from the component is greater than the power proxy threshold value for that component, then the power manager sends a set of signals to one or more on-chip actuators in the power proxy unit (step 920). That is, based on the comparison, if the power usage estimate value exceeds the cap, then the power manager may send signals for the set of on-chip actuators to adjust a set of operational parameters in the power proxy unit to decrease the frequency, voltage, and/or pipeline instruction rate of the component.

The set of on-chip actuators in the power proxy unit adjusts frequency, voltage, pipeline instruction rate, and/or the like, based on the received signals (step 922), with the operation returns to step 902 thereafter. If at step 918 the power usage estimate value from the component is less than the power proxy threshold value for that component, then the operation returning to step 902. That is, based on the comparison, if the power usage is not being exceeded, the power manager may send signals for the set of on-chip actuators in the power proxy unit to increase the frequency, voltage, and/or pipeline instruction rate of the component.

Thus, the illustrative embodiments provide mechanisms for using power proxies combined with on-chip actuators to meet a defined power target. A high-level power management controller monitors temperature, leakage voltage, and/or the like, for each of a set of components in the data processing system. Based on an overall predetermined power scheme for the data processing system, the high-level power management controller automatically sets or adjusts a power proxy threshold value for each component in the set of components. Component hardware compares an obtained power proxy usage estimate of the component to the power proxy threshold value identified by the high-level power management controller. In response to the obtained power proxy usage estimate exceeding the set power proxy usage estimate, the component hardware engages an on-chip actuation to either increase or decrease the power consumption of the component.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for using a power proxy unit combined with on-chip actuators to meet a defined power target value identifying a target power consumption of a component of the data processing system, the method comprising:
    identifying, by a power manager in the data processing system, a power proxy threshold value, for the defined power target value, identifying a maximum power usage for the component, and a power usage estimate value identifying a current power usage estimate for the component, wherein identifying the power usage estimate value for the component further comprises:
        identifying, by the power proxy unit, a set of activities to be monitored for the component;
        storing, by the power proxy unit, a value for each activity of the set of activities in an assigned counter of a first set of counters, forming a set of stored values, wherein the value comprises a count registered by the counter multiplied by a first weight factor specific to the activity, wherein the count is based on a number of occurrences of the activity;
    grouping, by the power proxy unit, the set of activities into subsets based on type of the activities;
    summing, by the power proxy unit, the stored values corresponding to each activity in each of the subsets to reach a total value for each of the subsets;
    multiplying, by the power proxy unit, for each of the subsets, the total value of the subset by a second weight factor corresponding to the subset to form a scaled value for the subset;
    summing, by the power proxy unit, the scaled values for the subsets to form the power usage estimate value; and
    sending, by the power proxy unit, the power usage estimate value of the component to the power manager;
    determining, by the power manager, whether the power usage estimate value is greater than the power proxy threshold value;
    responsive to the power usage estimate value being greater than the power proxy threshold value, sending, by the power manager, a set of signals to one or more on-chip actuators in the power proxy unit associated with the component; and
    adjusting, by the one or more on-chip actuators, a set of operational parameters associated with the component in order to meet the defined power target value.

2. The method of claim 1, wherein the set of operational parameters is at least one of frequency, voltage, or pipeline instruction rate.

3. The method of claim 1, wherein identifying the power proxy threshold value for the component further comprises:
    monitoring, by a high-level power management controller, a set of conditions associated with the component;
    determining, by the high-level power management controller, the power proxy threshold value for the component using the set of conditions and an overall power scheme of the data processing system, wherein the overall power scheme identifies a desired power usage for the data processing system overall; and
    setting or adjusting the power proxy threshold value for the component in the power manager associated with the component.

4. The method of claim 3, wherein the set of conditions comprises at least one of a temperature of an area associated with the component, a voltage leakage associated with the component, or a voltage consumption associated with the component.

5. The method of claim 1, further comprising:
    storing, by the power proxy unit, a count of the number of occurrences of each activity of the set of activities in an assigned counter of a second set of counters for each activity of the set of activities.

6. The method of claim 1, further comprising:
    collecting, by the power proxy unit, the set of stored values; and
    responsive to collecting the set of stored values, setting, by the power proxy unit, corresponding counters, in the first set of counters, to zero.

7. The method of claim 1, wherein the component is one of a plurality of components in the data processing system, and wherein the method is performed for each component in the plurality of components.

8. The method of claim 1, wherein the component is one of a processor core or a cache memory of the data processing system.

9. An apparatus, comprising:
a processor; and
a memory coupled to the processor, wherein the memory comprises instructions which, when executed by the processor, cause the processor to:
identify a power proxy threshold value, for defined power target value, identifying a maximum power usage for a component, and a power usage estimate value identifying a current power usage estimate for the component, wherein the instructions to identify the power usage estimate value for the component further cause the processor to:
identify a set of activities to be monitored for the component;
store a value for each activity of the set of activities in an assigned counter of a first set of counters, forming a set of stored values, wherein the value comprises a count registered by the counter multiplied by a first weight factor specific to the activity, wherein the count is based on a number of occurrences of the activity;
group the set of activities into subsets based on type of the activities;
sum the stored values corresponding to each activity in each of the subsets to reach a total value for each of the subsets;
multiply, for each of the subsets, the total value of the subset by a second weight factor corresponding to the subset to form a scaled value for the subset;
sum the scaled values for the subsets to form the power usage estimate value; and
send the power usage estimate value of the component to a power manager;
determine whether the power usage estimate value is greater than the power proxy threshold value;
responsive to the power usage estimate value being greater than the power proxy threshold value, send a set of signals to one or more on-chip actuators in a power proxy unit associated with the component; and
adjust a set of operational parameters associated with the component in order to meet the defined power target value, wherein the one or more on-chip actuators adjust the set of operational parameters.

10. The apparatus of claim 9, wherein the set of operational parameters is at least one of frequency, voltage, or pipeline instruction rate.

11. The apparatus of claim 9, wherein the instructions to identify the power proxy threshold value for the component further cause the processor to:
monitor a set of conditions associated with the component;
determine the power proxy threshold value for the component using the set of conditions and an overall power scheme of the data processing system, wherein the overall power scheme identifies a desired power usage for the data processing system overall; and
set or adjust the power proxy threshold value for the component in the power manager associated with the component.

12. The apparatus of claim 11, wherein the set of conditions comprises at least one of a temperature of an area associated with the component, a voltage leakage associated with the component, or a voltage consumption associated with the component.

13. The apparatus of claim 9, wherein the instructions further cause the processor to:
store a count of the number of occurrences of each activity of the set of activities in an assigned counter of a second set of counters for each activity of the set of activities.

14. The apparatus of claim 9, wherein the instructions further cause the processor to:
collect the set of stored values; and
responsive to collecting the set of stored values, set corresponding counters, in the first set of counters, to zero.

15. The apparatus of claim 9, wherein the component is one of a plurality of components in the data processing system, and wherein the processor executes the set of instructions for each component in the plurality of components.

16. The apparatus of claim 9, wherein the component is one of a processor core or a cache memory of the data processing system.

17. A computer program product comprising a non-transitory computer readable storage medium having a computer readable program recorded thereon, wherein the computer readable program, when executed on a computing device, causes the computing device to:
identify a power proxy threshold value, for a defined power target value, identifying a maximum power usage for a component, and a power usage estimate value identifying a current power usage estimate for the component, wherein the computer readable program to identify the power usage estimate value for the component further cause the computing device to:
identify a set of activities to be monitored for the component;
store a value for each activity of the set of activities in an assigned counter of a first set of counters, forming a set of stored values, wherein the value comprises a count registered by the counter multiplied by a first weight factor specific to the activity, wherein the count is based on a number of occurrences of the activity;
group the set of activities into subsets based on type of the activities;
sum the stored values corresponding to each activity in each of the subsets to reach a total value for each of the subsets;
multiply, for each of the subsets, the total value of the subset by a second weight factor corresponding to the subset to form a scaled value for the subset;
sum the scaled values for the subsets to form the power usage estimate value; and
send the power usage estimate value of the component to a power manager;
determine whether the power usage estimate value is greater than the power proxy threshold value;
responsive to the power usage estimate value being greater than the power proxy threshold value, send a set of signals to one or more on-chip actuators in a power proxy unit associated with the component; and
adjust a set of operational parameters associated with the component in order to meet the defined power target value, wherein the one or more on-chip actuators adjust the set of operational parameters.

18. The computer program product of claim 17, wherein the computer readable program to identify the power proxy threshold value for the component further causes the computing device to:
 monitor a set of conditions associated with the component;
 determine the power proxy threshold value for the component using the set of conditions and an overall power scheme of the data processing system, wherein the overall power scheme identifies a desired power usage for the data processing system overall; and
 set or adjust the power proxy threshold value for the component in the power manager associated with the component.

19. The computer program product of claim 17, wherein the computer readable program further causes the computing device to:
 store a count of the number of occurrences of each activity of the set of activities in an assigned counter of a second set of counters for each activity of the set of activities.

20. The computer program product of claim 17, wherein the computer readable program further causes the computing device to:
 collect the set of stored values; and
 responsive to collecting the set of stored values, set corresponding counters, in the first set of counters, to zero.

* * * * *